(12) United States Patent
Junkins

(10) Patent No.: US 6,606,584 B1
(45) Date of Patent: Aug. 12, 2003

(54) DEFINING A NEIGHBORHOOD OF VERTICES IN A 3D SURFACE MESH

(75) Inventor: Stephen Junkins, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/430,622

(22) Filed: Oct. 29, 1999

(51) Int. Cl.$^7$ .................. G06F 17/10; G06F 17/50; G06T 15/00
(52) U.S. Cl. .................. 703/1; 703/2; 345/419; 345/420
(58) Field of Search .................. 703/2; 345/418, 345/423, 419, 421

(56) References Cited

U.S. PATENT DOCUMENTS 5,602,979 A * 2/1997 Loop .................. 345/423
6,266,062 B1 * 7/2001 Rivara .................. 345/419
6,356,263 B2 * 3/2002 Migdal et al. .................. 345/421

OTHER PUBLICATIONS

Lee et al., "Navigating through Triangle Meshes Implemented as Linear Quadtrees", ACM Transaction on Graphics, vol. 19, Issue 2, Apr. 2000, pp. 79–121.*

Floriani et al., "Hierarchical Triangulation for Multiresolution Surface Description", ACM Transaction on Graphics, vol. 14, No. 4, Oct. 1995, pp. 363–411.*

* cited by examiner

Primary Examiner—Hugh Jones
Assistant Examiner—Herng-der Day
(74) Attorney, Agent, or Firm—Fish & Richardson P.C.

(57) ABSTRACT

A computer creates a digital model of a 3D surface to be rendered. The computer obtains an initial digital model of the 3D surface and identifies base triangles in the initial model. Each base triangle is subdivided into a plurality of subdivision triangles. The computer assigns identifying labels to the subdivision triangles to indicate their positions in the base triangles. Thereafter, the computer further subdivides the digital model; for example by applying a computer-implemented test to a first identifying label corresponding to first subdivision triangle to automatically derive a second identifying label corresponding to a second subdivision triangle in a different base triangle and sharing an edge with the first subdivision triangle, using the first and second identifying labels to retrieve information about the first and second subdivision triangles, and then using this information to subdivide the first subdivision triangle into smaller triangles.

26 Claims, 4 Drawing Sheets

DEFINING A NEIGHBORHOOD OF VERTICES IN A 3D SURFACE MESH

TECHNOLOGICAL FIELD

This application relates to creating and rendering 3D surfaces in a computer system.

BACKGROUND

Many computer graphics applications render complex three-dimensional (3D) surface geometries by iteratively refining simple, coarse 3D geometries, known as "base meshes." In general, each base mesh is a collection of triangle faces, in which trios of adjacent points, or vertices, are connected to form an approximation of a 3D surface. This approximation represents a coarse approximation of a more complex, ideal 3D surface, known as a "limit subdivision surface," or "limit surface."

A computer creates an initial "subdivision surface" from a base mesh by applying a computational kernel, known as a "subdivision kernel," to the triangles and vertices in the base mesh. Repeated and recursive application of the subdivision kernel yields increasingly smooth meshes that converge at the limit surface as the number of iterations approaches infinity.

Producing a subdivision surface typically involves computing a weighted midpoint between each pair of vertices in each triangle (i.e., along each edge in the mesh) and then connecting the midpoints, or "tessellating" the triangle, to create four smaller triangles. The time required to subdivide a 3D surface mesh depends upon the technique used in tessellating the triangles in the mesh. More efficient tessellation techniques reduce processing time and therefore improve rendering speed.

In rendering 3D surfaces, computers must often calculate surface normal vectors to ensure realistic light shading of the surfaces. Simple lighting models use the angle between a surface normal vector and a vector in the direction of the light source to calculate how much light strikes the surface at a corresponding vertex. In general, the computer must compute a surface normal vector for each new vertex produced in the subdivision surface computations. As with tessellation, more efficient surface normal calculation reduces processing time and therefore improves rendering speed.

SUMMARY

In one aspect, the invention features using a computer to create a digital model of a 3D surface to be rendered. The computer obtains an initial digital model of the 3D surface and identifies first and second base triangles in the initial model. The first base triangle is subdivided into a plurality of subdivision triangles including a first subdivision triangle. Likewise, the second base triangle is subdivided into a plurality of subdivision triangles including a second subdivision triangle. The first and second subdivision triangles share an edge.

The computer assigns first and second identifying labels to the first and second subdivision triangles to indicate their positions in the first and second base triangles. Thereafter, the computer further subdivides the digital model. One technique for further subdividing the digital model includes applying a computer-implemented test to the first identifying label to derive the second identifying label automatically, using the first and second identifying labels to retrieve information about the first and second subdivision triangles, and then using this information to subdivide the first subdivision triangle into smaller triangles.

Other embodiments and advantages will become apparent from the following description and from the claims.

DETAILED DESCRIPTION

The techniques described here reduce the amount of time required to tessellate a 3D surface mesh. The distal neighbors of a triangle at a given subdivision level are identified using computations with O(1) (i.e., constant-time) complexity, as opposed to the O(logn) and O(n) complexity shown by other techniques. These techniques rely on information that can be stored in cache memory and therefore require few, if any, references or table look-ups out of cache memory. The techniques also lend themselves to implementation in hardware, using minimal gates, and are useful in a wide variety of 3D surface rendering applications, including finite element analysis and cartographic applications.

Figure 1:
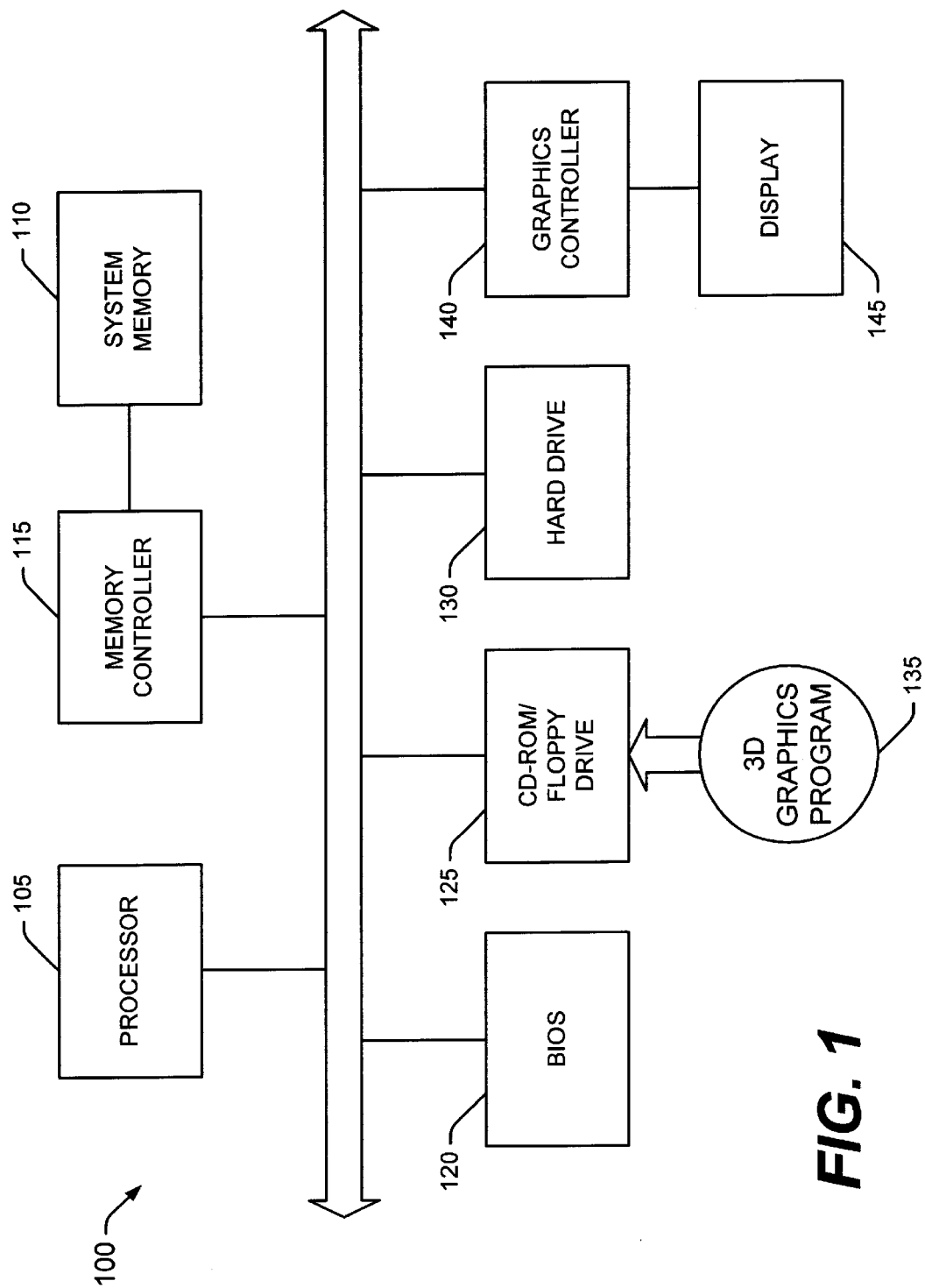
FIG. 1 is a block diagram of a computer system.

FIG. 1 shows a computer system 100 configured for use in 3D surface generating and rendering applications. The computer includes at least one central processor 105 that performs the operations necessary to generate and render 3D surfaces. In most systems, the processor 105 includes or has access to cache memory (not shown), which provides a temporary storage area for data accessed frequently by the processor 105. The computer also includes system memory 110, which stores program instructions and data needed by the processor 105. System memory 110 often includes one or more volatile memory devices, such as dynamic random access memory (DRAM). A memory controller 115 governs the processor's access to system memory 110.

The computer also includes various input and output components, such as a basic input/output system (BIOS) 120, a CD-ROM or floppy disk drive 125, and a hard disk drive 130. A 3D graphics program 135, such as a finite element analysis program or a cartography program loaded into the CD-ROM/floppy drive 125 or the hard drive 130, provides program instructions for execution by the processor 105 in generating 3D images. The 3D graphics program 135 includes instructions for implementing a subdivision surface generator, which allows the processor 105 to create a refined 3D surface from a base mesh that represents a coarse approximation of a limit surface. A graphics controller 140 receives data representing the 3D surfaces from the processor and renders 3D images on a display device 145, such as a cathode ray tube (CRT) display or a liquid crystal diode (LCD) display.

Figure 2:
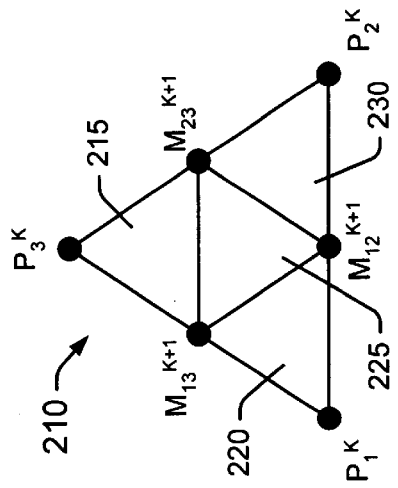
FIG. 2 illustrates the Butterfly Subdivision Scheme.

FIG. 2 illustrates one subdivision technique, known as the "Butterfly Subdivision Scheme," for use by the subdivision surface generator in refining a 3D surface mesh. This technique involves defining a local neighborhood 200 for each edge 205 in the mesh at a $k^{th}$ subdivision surface, where k=0 for the base mesh, and then calculating a midpoint ($m^{k+1}$) along the edge. Each neighborhood 200 includes eight vertices ($p_1^k$–$p_8^k$) defining six triangles arranged in a butterfly-shaped pattern. The computer applies a linear equation to the eight vertices in the neighborhood 200 to define the location of the midpoint $m^{k+1}$ in the k+1$^{th}$ subdivision surface. In general, the computer repeats this process for every edge in the mesh.

In the example shown here, the computer subdivides the edge 205 defined by the vertices $p_1^k$ and $P_2^k$ according to the following equation:

$$m^{k+1}=\tfrac{1}{2}(p_1^k+p_2^k)+2w(p_3^k+p_4^k)-w(p_5^k+p_6^k+p_7^k+p_8^k),$$

where w is a constant, known as the "global tension parameter," that controls the degree to which the subdivision kernel smoothes the surface. Therefore, the midpoint $m^{k+1}$ represents a simple linear combination, in the form of a weighted average, of the vertices $p_1^k$–$p_8^k$ in the local neighborhood 200. The weighting factors in the equation are selected to emphasize the vertex connectivity that most influences the local smoothness of the mesh at each midpoint.

Figure 3:
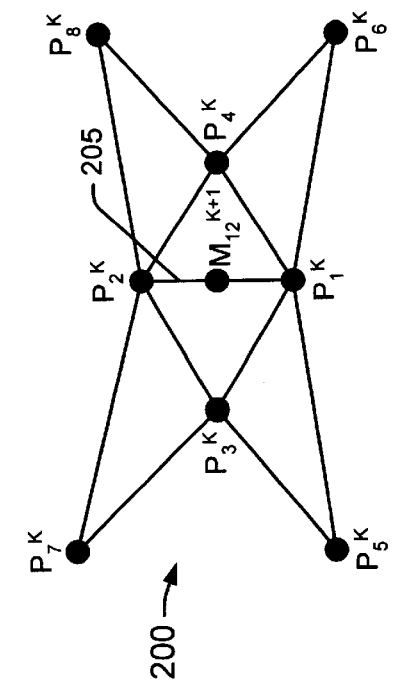
FIG. 3 illustrates the tessellation of a triangle in a 3D surface mesh.

The computer completes the k+1$^{th}$ subdivision surface by defining a butterfly-shaped neighborhood around each edge in the k$^{th}$ subdivision surface, applying the equation above to each neighborhood to define a corresponding midpoint, and triangulating, or tessellating, the k$^{th}$ subdivision surface by connecting the newly-defined midpoints. FIG. 3 shows a tessellated triangle 210, in which the midpoints $m_{12}^{k+1}$, $m_{13}^{k+1}$, and $m_{23}^{k+1}$ between the pairs of vertices $p_1^k$–$p_2^k$, $p_1^k$–$p_3^k$, and $p_2^k$–$p_3^k$, respectively, are connected to create four smaller triangles 215, 220, 225, 230. Using the Butterfly Subdivision Scheme to subdivide a 3D surface model is described in more detail in Dyn, N., Levin, D., and Gregory, J. A., "A Butterfly Subdivision Scheme for Surface Interpolation with Tension Control," ACM Transactions on Graphics 9, 2 (1990).

When implementing the Butterfly Subdivision Scheme in a computer system, quickly gathering the vertices in each of the local neighborhoods is critical for computational efficiency. One technique for gathering vertices in a neighborhood involves maintaining an explicit pointer data structure in which each triangle in the mesh points to each of its neighboring triangles. This technique is relatively inefficient, however, because neighbor-finding operations using the pointer data structure adds O(n) complexity, where n is the number of triangles in the mesh. Another technique involves storing a quad-tree data structure that mimics the hierarchical nature of the subdivision surfaces, where each triangle in the mesh is subdivided into four triangles, which in turn are subdivided into four smaller triangles. However, a naive pointer-based quad tree is also relatively inefficient as neighbor finding adds O(logn) complexity, where n is the depth of the quad tree.

Figure 4:
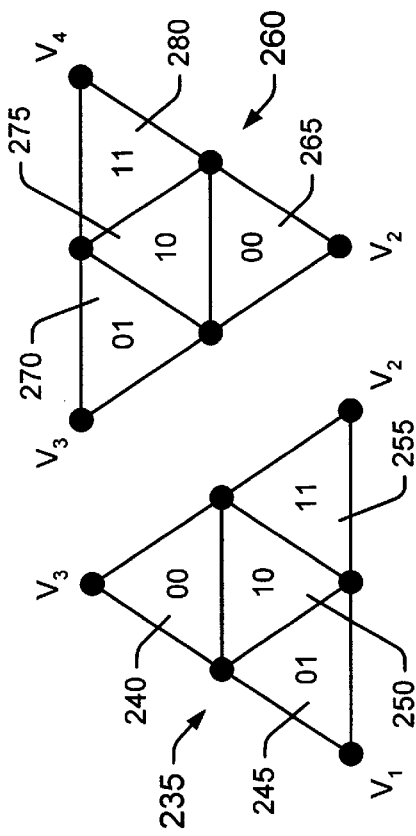
FIG. 4 illustrates a hierarchical labeling scheme for triangles in a 3D surface mesh.

FIG. 4 illustrates a refinement of the quad-tree technique, which allows implementation of neighbor-finding operations in a constant time (i.e., O(1) complexity) algorithm. The refined technique involves encoding the hierarchical structure of each triangular quad tree into address strings composed of two-bit pairs, where each triangle in the base mesh, or each "base triangle," represents the root of a quad tree. Each data string serves as a unique address for a particular triangle in one of the quad trees. Each subdivision level within a quad tree adds a pair of bits to the string. In this manner, all quad tree relationships are encoded directly into the address strings.

For example, a "tip-up" base triangle 235 that has been subdivided once includes four smaller triangles 240, 245, 250, 255, arranged in a pyramid pattern. In one implementation of the refined quad tree technique, the triangle 240 at the top of the pyramid is labeled with the two-bit string "00". The three triangles 245, 250, 255 at the base of the pyramid are labeled with the bit pairs "01", "10", and "11", respectively.

Likewise, a "tip-down" base triangle 260 that has been subdivided once includes four smaller triangles 265, 270, 275, 280 arranged in an inverted-pyramid pattern. The triangle 265 at the bottom of the inverted pyramid is labeled with the string "00", and the triangles 270, 275, 280 at the base of the inverted-pyramid are labeled with the strings "01", "10", and "11", respectively.

The four triangles 240, 245, 250, 255 in one of the base triangles 235 are further subdivided into newly formed triangles in a second subdivision layer. These are labeled with four-bit data strings identifying their exact positions within the base triangle 235. The number of bits in the data string is then $2^n$; where n is the number of subdivision layers. All of the quad trees use the same labeling scheme, so the computer can quickly and easily determine a triangle's neighbors within a quad tree by using the triangle's label to retrieve the labels of the neighboring triangles from a look-up table. This technique is described in more detail in Lee, Michael, and Samet, Hanan, "Navigating Through Triangle Meshes Implemented as Linear Quadtrees," Tech. Rep. CS-TR-3900, University of Maryland, Department of Computer Science (1998).

Figures 5, 6:
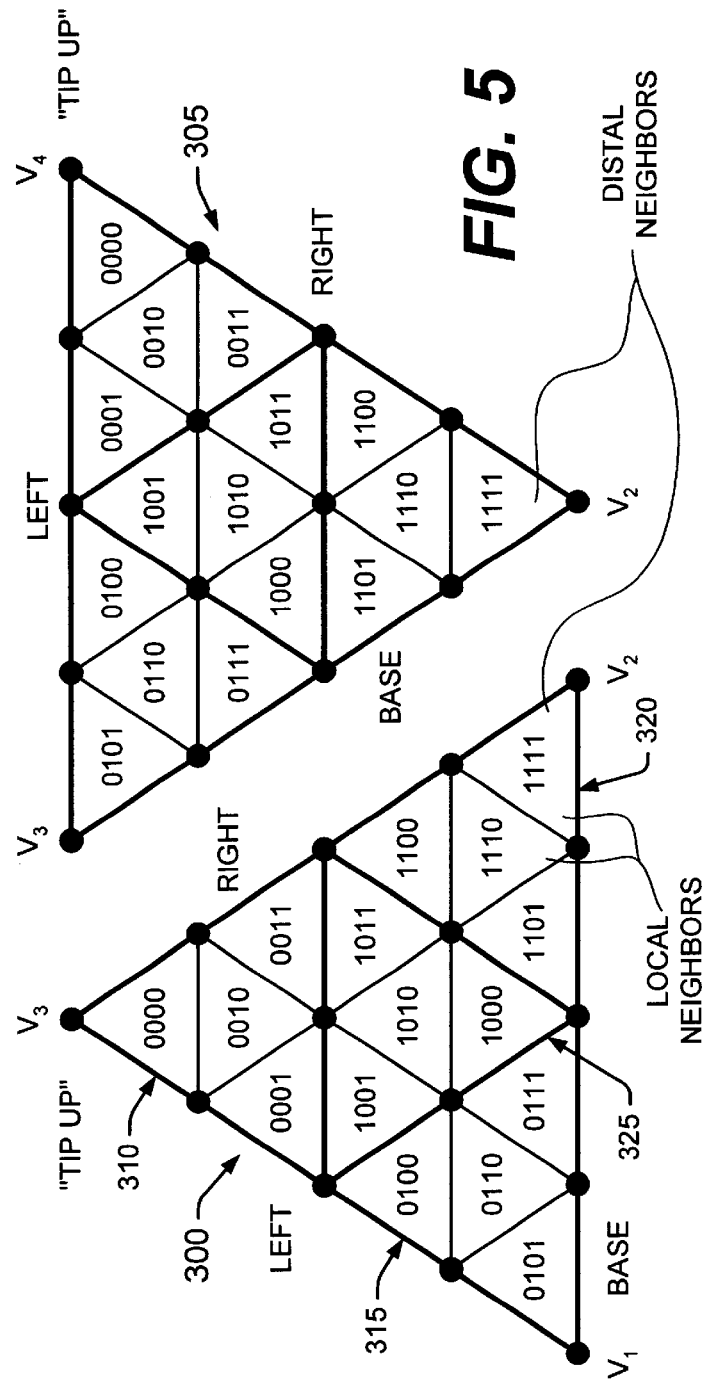
FIGS. 5, 6, and 7 illustrate a technique for finding distal neighbors of a triangle in a 3D surface mesh.

FIGS. 5 and 6 illustrate a further refinement of this hierarchical labeling technique. This refinement allows quick and easy identification of a triangle's "distal neighbors." A triangle's distal neighbors are those triangles that share edges with the triangle of interest but that lie in another quad tree, or base triangle. For example, the triangles labeled "1110" and "1111" in the left-most base triangle 300 in FIG. 5 are local neighbors, and the triangles labeled "1111" in the base triangles 300, 305 are distal neighbors.

In applying this neighbor-finding technique, the computer treats all of the base triangles 300, 305 as "tip-up" triangles and labels each triangle in a subdivision layer according to its orientation with respect to the triangle that it subdivides. Therefore, the first subdivision layer of each base triangle 300 includes three "tip-up" triangles 310, 315, 320, one at each corner of the base triangle 300. The first subdivision layer of each base triangle 300 also includes one "tip-down" triangle 325, which lies at the center of the base triangle. Likewise, each of the "tip-up" triangles 310, 315, 320 includes three "tip-up" triangles and one "tip-down" triangle. Each "tip-down" triangle 325 includes three "tip-down" triangles and one "tip-up" triangle.

The computer also labels the edges of each base triangle 300, 305 based upon their positions relative to the triangle's tip. The edge opposite the tip is the triangle's "base" edge; the triangle's "left" edge lies on the left side of the base edge when viewed "tip up"; and the triangle's "right" edge lies on.the right side of the base edge when viewed "tip up". When applying these labeling conventions, the computer can select any vertex in a base triangle as the tip.

FIG. 6 shows a look-up table that stores nine constant-time operators. These operators allow the computer to find a triangle's distal neighbors quickly and easily. Only those triangles that lie along an edge of the corresponding base triangle have a distal neighbor. Triangles that lie along two edges of the corresponding base triangle have two distal neighbors.

The constant-time operators are stored in the table according to the relative orientations of the base triangles in which the distal neighboring triangles lie. The table includes nine cells arranged in a 3×3 array. Each row and each column of the table is indexed by an edge label ("left", "right", "base") from one of the base triangles in a neighboring pair. The computer retrieves information from the table by matching the row and column indices to the two edge labels assigned to the edge shared by two distal-neighbor triangles.

For example, the triangle labeled "0011" in the left-most base triangle 300 and the triangle labeled "0111" in the right-most base triangle 305 share the edge that connects vertices $v_2$ and $v_3$. This edge is labeled "right" on the left-most base triangle 300 and "base" on the right-most base triangle 305. The computer retrieves the appropriate constant-time operator from the look-up table by accessing the cell that lies in the table's "right" row and "base" column. This cell contains the operator "00→01".

The computer applies this operator by replacing every occurrence of the bit pattern "00" in the triangle of interest with the bit pattern "01". In this example, the computer calculates the four-bit label for the distal neighbor of the "0011" triangle by replacing the first two bits ("00") with the bit pattern "01". The last two bits ("11") remain unchanged. This yields a four-bit label of "0111", which matches the label of the "0011" triangle's distal neighbor.

Likewise, this technique reveals that a distal neighbor of the "0000" triangle in the left-most base triangle 300 is the "0101" triangle in the right-most base triangle 305; a distal neighbor of the "1100" triangle in the left quad tree is the "1101" triangle in the right quad tree; and a distal neighbor of the "1111" triangle in the left quad tree is the "1111" triangle in the right quad tree.

Figure 7:
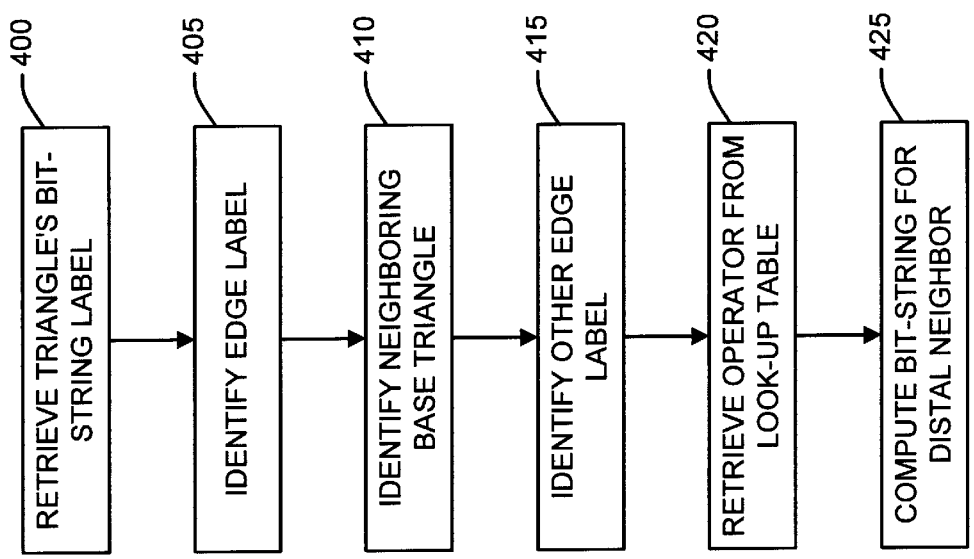

FIG. 7 illustrates the neighbor-finding process in more detail. The computer, under direction of the subdivision surface generator portion of the 3D graphics program, first retrieves the bit-string label of the triangle of interest, i.e., the triangle for which distal neighbors are to be identified (step 400). The computer then identifies the edge label assigned to the edge across which the distal neighbor lies, based upon the orientation of the base triangle in which the triangle of interest lies (step 405). Using this edge label, the computer identifies the base triangle in which the distal neighbor lies (step 410). One technique for doing so includes accessing a conventional pointer data structure that is pre-computed and stored only for the base mesh.

Upon identifying the neighboring base triangle, the computer identifies a second edge label assigned to the edge across which the distal neighbor lies, based upon the orientation of the neighboring base triangle (step 415). The computer then uses the two edge labels to retrieve the constant-time operator from the appropriate cell of the look-up table (step 420). The computer applies the constant-time operator to the bit-string label of the triangle of interest to derive the bit-string label for the distal neighbor triangle (step 425).

A number of embodiments of the invention are described above. A person of ordinary skill will recognize that various scope of the invention. For example, while the invention has been described in terms of the Butterfly Subdivision Scheme, it is useful with other subdivision schemes, such as Loop's scheme, as well. Moreover, while the invention has been described in terms of a programmable computer executing program instructions, other implementations are realized in discrete digital components, in application specific integrated circuits (ASICs), and in some combination of these technologies. Accordingly, other embodiments are within the scope of the following claims.

What is claimed is:

1. A method comprising:
   defining first and second base triangles in an initial model of the 3D surface, wherein the defining includes identifying each edge of the first and second base triangles as a right edge, a left edge, or a base edge;
   subdividing the first and second base triangles into a plurality of subdivision triangles;
   assigning identifying labels to the plurality of subdivision triangles to indicate their positions in the first and second base triangles;
   assigning one or more edge labels to each of the plurality of subdivision triangles having one or more edges along a corresponding edge of the corresponding base triangle, the edge label indicating that the corresponding edge of the corresponding base triangle is the right edge, the left edge, or the base edge; and thereafter further subdividing the digital model by:
   applying a computer-implemented test to a first identifying label of a first subdivision triangle of the first base triangle to derive a second identifying label of a second subdivision triangle of the second base triangle sharing a common edge with the first subdivision triangle, the computer-implemented test including selecting a bit replacement scheme based on an edge label of the first subdivision triangle and an edge label of the second subdivision triangle;
   using the first and second identifying labels to retrieve information about the first and second subdivision triangles; and
   using the information to subdivide the first subdivision triangle into smaller triangles.

2. The method of claim 1, wherein applying a computer-implemented test further includes modifying at least a portion of the first identifying label according to the bit replacement scheme to obtain the second identifying label.

3. The method of claim 2, wherein applying a computer-implemented test further comprises determining an appropriate entry in a look-up table, the appropriate entry corresponding to the edge label of the first subdivision triangle and the edge label of the second subdivision triangle, and wherein applying a computer-implemented test further comprises retrieving the bit replacement scheme from the appropriate entry of the look-up table.

4. The method of claim 1, wherein n is a number of subdivisions applied to the first and second base triangles in creating the first and second subdivision triangles, and wherein assigning the first and second identifying labels includes assigning a string of 2n bits to each of the first and second subdivision triangles.

5. The method of claim 6, wherein the bit replacement scheme identifies at least one of the 2n bits in the first identifying label to modify in order to derive the second identifying label.

6. The method of claim 1, wherein assigning the plurality of identifying labels includes assigning the labels according to a pattern that is common to both the first and second base triangles.

7. The method of claim 1, wherein retrieving information about the first and second subdivision triangles includes retrieving coordinates for data points that define vertices for the triangles.

8. A computer program, stored on a tangible storage medium, the program comprising executable instructions that cause a computer to:
   identify first and second base triangles in an initial model of a 3D surface;

identifying each edge of the first and second base triangles as a right edge, a left edge, or a base edge;

subdivide the first and second base triangles into a plurality of subdivision triangles;

assign identifying labels to the plurality of subdivision triangles to indicate their positions in the first and second base triangles;

assign one or more edge labels to each of the plurality of subdivision triangles having one or more edges along a corresponding edge of the corresponding base triangle, the edge label indicating that the corresponding edge of the corresponding base triangle is the right edge, the left edge, or the base edge; and thereafter further subdivide the digital model by:

applying a test to a first identifying label of a first subdivision triangle of the first base triangle to derive a second identifying label of a second subdivision triangle of the second base triangle sharing a common edge with the first subdivision triangle, the test including selecting a bit replacement scheme based on an edge label of the first subdivision triangle and an edge label of the second subdivision triangle;

using the first and second identifying labels to retrieve information about the first and second subdivision triangles; and using the information to subdivide the first subdivision triangle into smaller triangles.

9. The program of claim 8, wherein, in applying the test to the first identifying label, the computer modifies at least a portion of the first identifying label according to the bit replacement scheme to obtain the second identifying label.

10. The program of claim 9, wherein applying the test to the first identifying label further comprises determining an appropriate entry in a look-up table, the appropriate entry corresponding to the edge label of the first subdivision triangle and the edge label of the second subdivision triangle, and wherein applying the test to the first identifying label further comprises retrieving the bit replacement scheme from the look-up table.

11. The program of claim 8, wherein, in assigning the first and second identifying labels, the computer assigns a string of 2n bits to each of the plurality of subdivision triangles, where n is a number of subdivisions applied to the first and second base triangles in creating the plurality of subdivision triangles.

12. The program of claim 11, wherein the bit replacement scheme identifies at least one of the 2n bits in the first identifying label to modify in order to derive the second identifying label.

13. The program of claim 8, wherein, in assigning the plurality of identifying labels, the computer assigns the labels according to a pattern that is common to both the first and second base triangles.

14. The program of claim 8, wherein, in retrieving information about the first and second subdivision triangles, the computer retrieves coordinates for data points that define vertices for the triangles.

15. A computer system comprising:

a processor and a memory device coupled by a system bus;

a display device operable to display rendered images;

a graphics controller configured to receive data from the system bus and use the data in rendering images on the display device; and a 3D graphics program loaded into the memory device to assist the processor in delivering the data to the graphics controller, the 3D graphics program comprising executable instructions that cause the processor to:

identify first and second base triangles in an initial model of a 3D surface;

identifying each edge of the first and second base triangles as a right edge, a left edge, or a base edge;

subdivide the first and second base triangles into a plurality of subdivision triangles;

assign identifying labels to the plurality of subdivision triangles to indicate their positions in the first and second base triangles;

assign one or more edge labels to each of the plurality of subdivision triangles having one or more edges along a corresponding edge of the corresponding base triangle, the edge label indicating that the corresponding edge of the corresponding base triangle is the right edge, the left edge, or the base edge; and thereafter further subdivide the digital model by:

applying a test to a first identifying label of a first subdivision triangle of the first base triangle to derive a second identifying label of a second subdivision triangle of the second base triangle sharing a common edge with the first subdivision triangle, the test including selecting a bit replacement scheme based on an edge label of the first subdivision triangle and an edge label of the second subdivision triangle;

using the first and second identifying labels to retrieve information about the first and second subdivision triangles; and using the information to subdivide the first subdivision triangle into smaller triangles.

16. The system of claim 15, wherein, in applying the test to the first identifying label, the program modifies at least a portion of the first identifying label according to the bit replacement scheme to obtain the second identifying label.

17. The system of claim 16, wherein applying the test to the first identifying label further comprises determining an appropriate entry in a look-up table, the appropriate entry corresponding to the edge label of the first subdivision triangle and the edge label of the second subdivision triangle, and wherein applying the test to the first identifying label further comprises retrieving the bit replacement scheme from the appropriate entry of the look-up table.

18. The system of claim 15, wherein, in assigning the first and second identifying labels, the processor assigns a string of 2n bits to each of the plurality of subdivision triangles, where n is a number of subdivisions applied to the first and second base triangles in creating the plurality of subdivision triangles.

19. The system of claim 18, wherein the bit replacement scheme identifies at least one of the 2n bits in the first identifying label to modify in order to derive the second identifying label.

20. The system of claim 15, wherein, in assigning the plurality of identifying labels, the processor assigns the labels according to a pattern that is common to both the first and second base triangles.

21. The system of claim 15, wherein, in retrieving information about the first-and second subdivision triangles, the processor retrieves coordinates for data points that define vertices for the triangles.

22. A method, comprising:

assigning a position label to a subdivision triangle of a base triangle, the position label indicating the position of the subdivision triangle in the base triangle, wherein the base triangle has a left edge, a right edge, and a base edge;

assigning an edge label to the subdivision triangle, the edge label identifying an edge of the base triangle along which an edge of the subdivision triangles lies;

determining a position label of another subdivision triangle, the another subdivision triangle included in another base triangle having a left edge, a right edge, and a base edge, the another subdivision triangle sharing a shared edge with the subdivision triangle, wherein determining the position label of the another subdivision triangle comprises:

determining an edge label of the another subdivision triangle, wherein the edge label indicates whether the shared edge lies along the left edge, the right edge, or the base edge of the another base triangle;

determining a bit replacement scheme based on the edge label of the subdivision triangle and the edge label of the another subdivision triangle; and modifying the position label of the subdivision triangle according to the bit replacement scheme in order to derive the position label of the another subdivision triangle.

23. The method of claim 22, further comprising using the position label of the subdivision triangle to retrieve information about the subdivision triangle and using the position label of the another subdivision triangle to retrieve information about the another subdivision triangle.

24. The method of claim 23, wherein the information about the subdivision triangle includes a position of one or more vertices of the subdivision triangle, and the information about the another subdivision triangle includes a position of one or more vertices of the another subdivision triangle.

25. The method of claim 24, further comprising using the position of the one or more vertices of the subdivision triangle and the position of the one or more vertices of the subdivision triangle to subdivide the subdivision triangle.

26. The method of claim 25, wherein the using the position of the one or more vertices of the subdivision triangle and the position of the one or more vertices of the subdivision triangle to subdivide the subdivision triangle comprises subdividing the subdivision triangle according to a scheme chosen from the group consisting of the Butterfly Subdivision Scheme and Loop's scheme.

* * * * *